United States Patent [19]

Levis

[11] 4,066,887
[45] Jan. 3, 1978

[54] SEGMENTED SECTIONAL REFLECTION FOR THE PROJECTION OF LIGHT BEAMS AND ITS METHOD OF PRODUCTION

[76] Inventor: Maurice Levis, 201 F 77 St., Apt. 7F, New York, N.Y. 10021

[21] Appl. No.: 736,237

[22] Filed: Oct. 27, 1976

[51] Int. Cl.² ............................ F21V 7/00; G02B 5/10
[52] U.S. Cl. .................................... 362/341; 350/293; 350/320; 353/98; 362/346; 362/350
[58] Field of Search ................... 240/41.35 R, 41.35 F, 240/41.36, 103 R, 104, 105; 353/98; 350/293, 320

[56] References Cited

U.S. PATENT DOCUMENTS

| | | | |
|---|---|---|---|
| 1,248,456 | 12/1917 | Clark | 240/41.36 |
| 3,689,760 | 9/1972 | Swoart, Jr. | 240/41.35 R |

FOREIGN PATENT DOCUMENTS 450,131  9/1927  Germany ..................... 240/41.35 F

*Primary Examiner*—L. T. Hix
*Assistant Examiner*—M. L. Gellner
*Attorney, Agent, or Firm*—Eliot S. Gerber

[57] ABSTRACT

A projection system, such as a slide film or motion picture projection system, includes a light source, a reflector, a film gate or aperture, and a screen. The reflector is formed from a deep-dish ellipse reflector by cutting the ellipse into at least three reflector sectors and then outwardly radially deforming the outer edges, the deformation occurring within a certain critical range. The deformed outer edges are then clamped by circular clamping means.

15 Claims, 10 Drawing Figures

SEGMENTED SECTIONAL REFLECTION FOR THE PROJECTION OF LIGHT BEAMS AND ITS METHOD OF PRODUCTION

BACKGROUND OF THE INVENTION

The present invention relates to projection systems such as slide film projection systems and motion picture projection systems, and more particularly to the lighting system utilized in such projection systems. In such projectors a rectangular aperture of moderate size is desired to be illuminated with a light beam so that the light crossing the aperture has a fairly even distribution over the entire screen.

Projection systems, such as slide film projectors, opaque projectors and motion film projectors, in general, are composed of a light source, optical elements that collect the light and project it as a light beam onto an aperture, and additional optical elements that project an image of the aperture onto a viewing screen. When a film transparency, such as a motion film picture film, is introduced into the aperture, the image depicted on the film is projected onto a screen.

It has been considered generally desirable to achieve as even a distribution of illumination on the screen as is attainable and to seek a high efficiency in the transfer of light from the light source to the screen. High efficiency in light transfer is desirable because it means that less power is required from the lamp, which permits the use of a smaller lamp and generates less heat at the film aperture (also called the "gate"). These advantages of high light transfer efficiency tend to reduce the construction and operating cost of projection systems. For example, if the light source is an xenon arc lamp of 600 watts instead of an xenon arc lamp of 1,000 watts, the size and the cost of the power supply may be considerably reduced, the size and cost of the reflector and casing may be reduced, and a less expensive lamp may be utilized.

At the present time projection systems, such as slide film projection systems and motion picture projection systems, utilize a variety of internal light sources, depending upon such factors as the desired degree of even light distribution on the screen, the desired efficiency of light transfer from the light source to the screen, the level of illumination, the cost of the system, and the frequency of its use. Generally speaking, if it is desired to have a brighter picture, for example, permitting the image on the screen to be viewed under daylight conditions, then the illumination source must provide a relatively large quantity of light. On the other hand, slide projectors for viewing at home may use a relatively low level illumination source. For example, the Carousel (trademark of Kodak) line of slide film projectors uses a 500-watt tungsten lamp or a 500-watt quartz halogen lamp having a tungsten filament as its illumination source.

In those projectors in which it is desired to project a color slide under daylight conditions on a relatively large screen, for example, 20 feet by 20 feet, it is considered necessary to use a relatively high-powered xenon bulb as the light source. The brightest projection systems presently commercially available utilize xenon arc lamps as their light source. Xenon arc lamps are arc lamps having a gas-tight bulb, usually of quartz and filled with xenon gas. A xenon arc lamp will exhibit very high average luminance over its light emitting area, i.e., over the arc plasma, many times higher luminance than commonly used incandescent projection bulbs. For this reason xenon arc lamps are admirably suited for projector applications. A conventional daylight slide projector for projection upon a 20 × 20 ft. screen may utilize an xenon arc lamp of about 1,000 watts power.

Generally, in high quality projection systems using xenon arc lamps, the arc lamp is positioned in front of, and at the center of, a reflector. Xenon arc lamps are presently conventionally mounted on deep-dish elliptical reflectors. Such reflectors focus the emitting area of the arc, situated normally at the primary focus of the ellipse, onto an aperture (gate) which is situated at the secondary focal point of the ellipse. Such a lamp/reflector combination produces a circular pattern of light at the aperture; however, the aperture is normally rectangular in slide and film projection systems. In order to fill the aperture properly with relatively even illumination, the arc point of the arc lamp has to be moved relative to the primary focus of the elliptical reflector, in effect diffusing the arc image obtained at the aperture. This adjustment achieves a more even distribution of light across the aperture but decreases the efficiency of light transfer in that it causes substantial losses in the total amount of light that ends up on the projection screen.

Although the deep-dish elliptical reflector is almost universally used in commercial apparatus, other types of reflectors have been suggested from time to time in the past. The U.S. Pat. No. 1,248,456 to P. L. Clark, patented Dec. 4, 1917, shows at FIGS. 12 through 14 a four-part reflector having "independently adjustable sections." Each section of the reflector appears to have a curvature, although the specific curvature is not described. The patent states, in respect to its FIG. 2, that the plurality of concave mirrors "may be ellipsoidal, spherical, parabolic or of other curvatures approximating the above, or a combination of two or more of them" (page 1, lines 61–64). The sectional reflectors of the Clark patent, consequently, appear to be sections of an ellipsoid sphere or a parbola, each of the sections having a common axis through the imaginary point where the points of the sections would meet.

OBJECTIVES AND FEATURES OF THE PRESENT INVENTION

The main objective of the present invention is to provide a reflector which, when used in conjunction with an arc light source, can direct a beam of light at a typical rectangular film aperture with high efficiency, i.e., the minimum loss of light transferred from the lamp to the screen, and provide an improved even distribution of illumination across the aperture.

It is a further objective of the present invention to provide a projector system which achieves relatively high light transfer efficiency through an aperture and a relatively good distribution of illumination over the aperture without the use of any other optical elements between the arc lamp/reflector module and the aperture. Typically, slide projectors with relatively large apertures (1.346 inch × 0.902 inch, 1.5 inch × 1.5 inch) presently use condensing lens elements for the purpose of achieving even distribution of light across the aperture. Such condensing lenses result in losses of light as well as impede the cooling of the film gate with forced air since the lenses are normally located extremely close to and immediately behind the film gate.

It is a further objective of the present invention to provide a projection system in which the heat radiation emitted by the arc lamp/reflector module is distributed in such a way as to minimize the heat at the film aperture (film gate).

It is a further objective of the present invention to provide a reflector in a projection system which permits one to achieve various types of light distributions on the screen that are not normally obtainable from elliptical reflectors now in use. For example, one such desirable light distribution suited to near screen projection is to produce more light at the edges and corners of the screen than at its center.

It is a further objective of the present invention to provide a light source for a projection system such as a slide film projection system or a motion picture projection system in which the reflector will provide a relatively even distribution of light on the screen, and more specifically that the light at the sides and corners of the screen will not be relatively dim compared to the light in the center.

It is a further objective of the present invention to provide a projection system which will be relatively efficient in its utilization of the available light from its lamp so that a relatively low-powered lamp may be utilized, that is, to achieve a relatively high level of illumination at the screen for each watt of power consumed by the lamp.

It is a further objective of the present invention to provide a projection system in which, due to its relatively high efficiency in transmission of light from the source to the screen, will enable the projection system, including the lamp and the reflector and the power supply, to be produced at a relatively lower cost and be housed in a relatively smaller sized unit.

It is a further objective of the present invention to provide a light source for utilization in a slide projector in which color slides may be viewed on a large screen, for example, of 400 to 600 square feet, under daylight conditions, and yet the light source would utilize a relatively low-powered xenon arc lamp of less than 800 watts in power.

It is a further objective of the present invention to provide an enclosed module as a safety measure in a projection system, the unit having therein an arc lamp and a reflector.

It is a further objective of the present invention to provide a method for producing a high-efficiency reflector for use in projectors, which reflector may be produced in relatively small quantities and at a relatively low cost and yet have a high degree of optical accuracy.

BRIEF DESCRIPTION OF THE DRAWINGS

Other objectives and features of the present invention will be apparent from the following detailed description, taken in conjunction with the accompanying drawings. The detailed description provides the inventor's presently known best mode of practicing the invention.

In the drawings.

DESCRIPTION OF THE INVENTION

Figure 1:
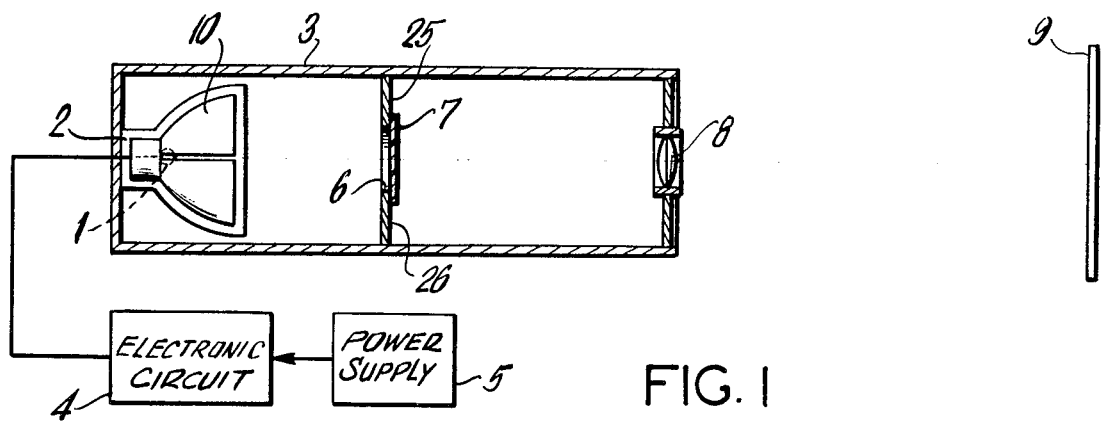
FIG. 1 is a diagrammatic illustration, partly in cross-section, of the projection system of the present invention.

As shown in FIG. 1, the projection system of the present invention includes an xenon arc lamp 1 and a reflector 10 which form a module 2. The module 2, and the other elements of the projection system, are mounted within a light-tight casing 3. The xenon arc lamp is powered by an electronic igniter circuit 4 which is connected to a d.c. power supply 5. The light beam from reflector 10 is directed through the aperture 6 (film gate) in which a photographic slide or motion picture film 7 is positioned. The image is focused by projection lens 8, for example, a conventional three-element convex-convex projection lens, and shown on screen 9. The elements of the projection system, except for the reflector 10 described in detail below, are known in the photography art. For example, the electronic circuit may be of the single-pulse sustainer type or the continuous radio-frequency type. In the single-pulse sustainer type capacitors are used across the arc lamp to aid in obtaining and sustaining a breakdown voltage across the arc gap until the normal self-sustaining operating current across the gap is attained.

The present invention utilizes an elliptical reflector 10 which is preferably constructed by initially forming a flexible reflecting sheet material as a symmetric, elliptical conic section with an extended neck at the closed end of the ellipse. The starting form of the reflector is preferably obtained by spinning aluminum metal and polishing the spun aluminum. Subsequently, the outer wider end of the reflector 10 is segmented into four quadrants 11-14 as shown in FIG. 2, and each quadrant 11-14 is further deformed from its initial shape both radially and circumferentially.

Figure 2:
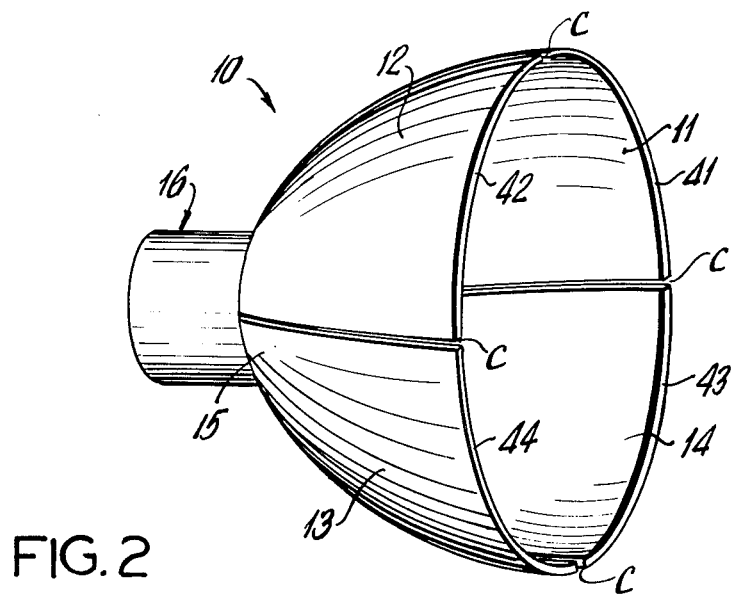
FIG. 2 is a perspective view of the segmented reflector of the present invention prior to deformation to its final shape.

The following is a description of the preferred type of deformation on the reflector shown in FIG. 2 which is required in order for the reflector/arc lamp system to project a quasi-rectangular cross-section beam having a relatively even distribution of light across a rectangular aperture.

Figure 3:
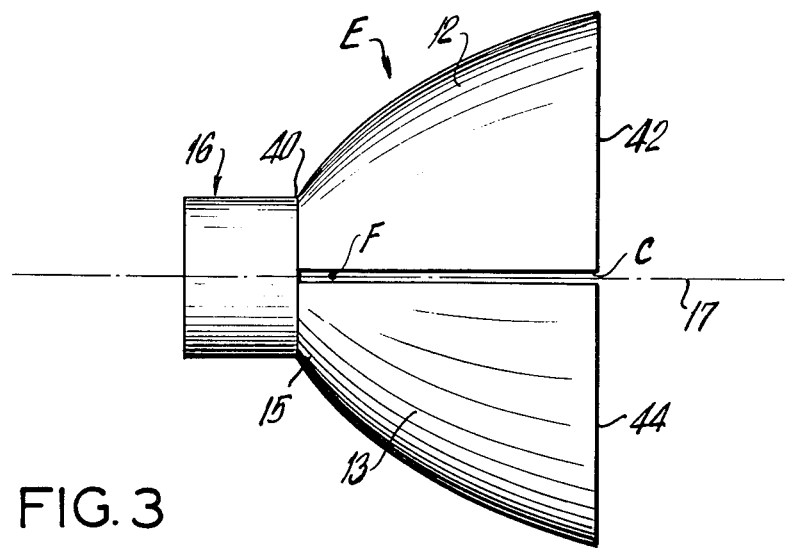
FIG. 3 is a side plan view of the reflector of FIG. 2.

In the initial stage, as shown in FIG. 2, the quadruzonal reflector 10 is formed as a simple elliptical conic section. The focal length, see FIG. 3, is determined primarily by mechanical considerations in relation to the size of the arc lamp bulb. The arc lamp bulb has to clear the back end 15 of the reflector. The eccentricity E of the ellipse is chosen on the basis of the desired image magnification, which is given by the formula below:

$$M = \frac{1 + e \cos i_I}{1 - e \cos i_E}$$

where "M" is the magnification and where the angles $i_I$ and $i_E$ are respectively the angles subtended from the elliptical surface to the object and image locations. Another important consideration (FIGS. 3 and 5) in the design of the reflector is the desired distance between F, the primary focus of the ellipse, and F', the location of the secondary focus, or image point, of the ellipse. The selection of the eccentricity E and focal distance F completely defines the elliptical surface.

In proceeding with the desired deformation, the elliptical reflector is cut into four quadrants 11–14, which quadrants are symmetric and are still attached to the neck 16 of the reflector 10 (FIG. 3). The neck 16 is tubular and therefore round in cross-section.

Figure 5:
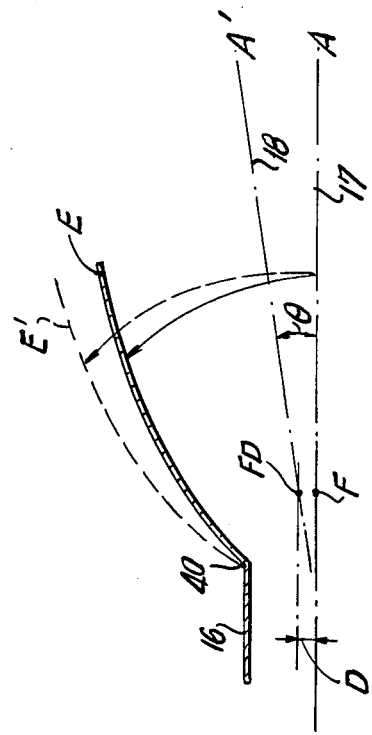
FIG. 5 is a longitudinal cross-section of the reflector of FIG. 2 showing its initial curvature, as in FIG. 4, and its final curvature.

The radial deformation (translation) of each quadrant is achieved by pulling each quadrant out, in a peeling motion, from its original uncut position, as shown in FIG. 5. Each quadrant is a truncated sector and is referred to as a "reflector sector." This deformation is outward from the central imaginary axis 17 (optical axis). FIG. 5 is a longitudinal cross-section of the reflector, showing initial curve E and deformed position E'. In the deformed position, the central axis of the ellipse 17 has shifted from axis A (17) to A' (18) and the focal position F has shifted to FD. In setting the critical limits to the focus displacement distance D, we should refer to the nominal diameter of an arc discharge in xenon lamps. The distance "D", as shown in FIG. 5, is the distance from the primary focal point F of the original deep-dish ellipse to the new primary focal point FD of a reflector sector. The arc column, i.e., the arc discharge between the arc terminals, is nominally 1 to 3 mm in diameter. The allowable shift D in focus position should be in the range of equal to, or less than, the nominal radius of the arc column in use. Consequently, D should be less than 3 and preferably it should be:

$$0 < D < 2 \text{ mm}$$

This part of the deformation is essential to a simple rotation of each quadrant about line 40, at which line 40 the original ellipse meets the neck 16. Four quadrants 11–14 (reflector sectors) are shown, but the number of reflector sectors is always more than 3 and may be 8 or more.

Figure 4:
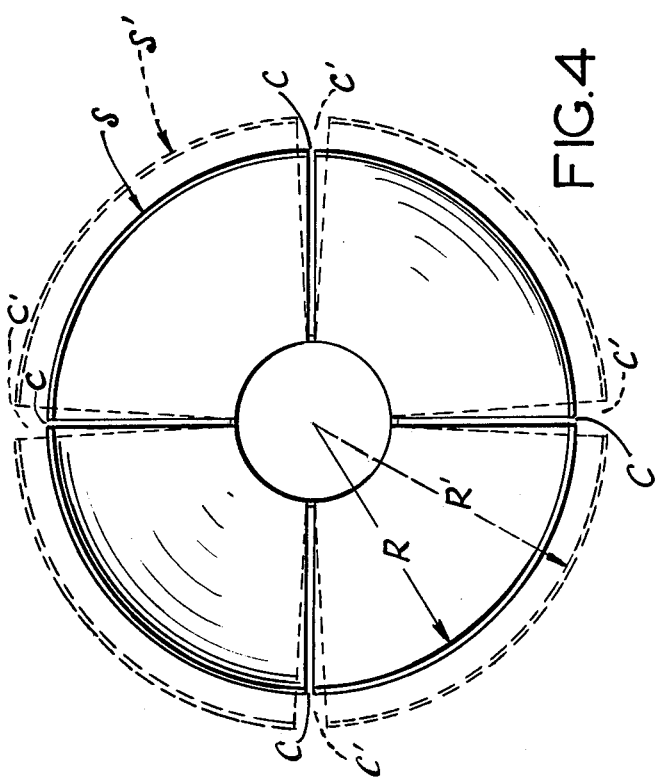
FIG. 4 is a front (face on) plan view of the reflector of FIG. 2, in dashed lines, after such deformation.

The circumferential deformation of the reflector is achieved by forcing the open end of the reflector, as shown in FIG. 4, to conform to a new circumference curve from the one it initially occupied before cutting and peeling the quadrants 11–14 outwards. As shown in FIG. 4, the initial circumference S of radius R is moved out to a new circumference S' of radius R'. In this new deformation, the sheet metal reflector is forced to conform to the new circumference S' by mechanical means. As the quadrants are rotated outwards, the four initial cuts C open up slightly to four large cuts C'.

The deformation movements described above are normally in the order of one millimeter or a fraction thereof in a reflector having an original radius R of 2 inches. The deformation, although physically slight, has a marked effect on screen light distribution and overall light transfer efficiency through a rectangular aperture.

Figure 8:
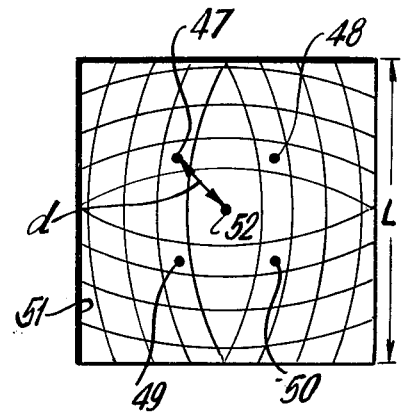
FIG. 8 is a front plan view of a film aperture receiving a beam of light from the reflector of the present invention.

The critical limits of deformation of the reflector sectors are related to relative magnitudes of R and R', respectively the original radius and the radius after deformation, both measured at the outer edges 41–44 of the reflector. As shown in FIG. 8, the aperture with which the reflector will be used has an imaginary aperture center 52. Each of the four new axes A', if each is extended, would meet a plane through the aperture 51 in the respective imaginary points 47–50. The distance "d" is between a point 47 of deformed axis A' and the center 52. The critical limits are then expressed by the formula:

$\tan \theta \simeq d/FF'$ where "FF'" is the distance between F and F' and d $\gamma$ 0.5L (preferred) and the critical range of d is: $0.1 < d < 0.8L$ Therefore, the critical range of $\theta$ is: arc tan $$\frac{0.1L}{FF'} < \theta < \arctan \frac{0.8L}{FF'}$$

and the preferred value of $\theta$ equals arc tan 0.5L/FF'FF'.

As shown in FIG. 3, the deformation occurs by bending along the curved line 40 where the curved portion of each sector meets the neck 16. The outer edges 41, 42, 43 and 44 of each of the respective sectors 11–14 are clamped so that they form sectors of a new circle S', which circle is in a plane vertical to the axis 17. The new circle S' has a radius slightly larger than the original circle S formed by the original position of the edges 41–44, that increased radius being the distance of the outward translation (outward deformation). The reflector sectors 11–14 consequently form a circle at a vertical plane to the axis 17 taken at line 40 and also, as mentioned above, form a circle at a vertical plane taken through the axis 17 at the outer edges 41–44. However, at points between sectors 11–14 they do not have a common axis.

Figure 10:
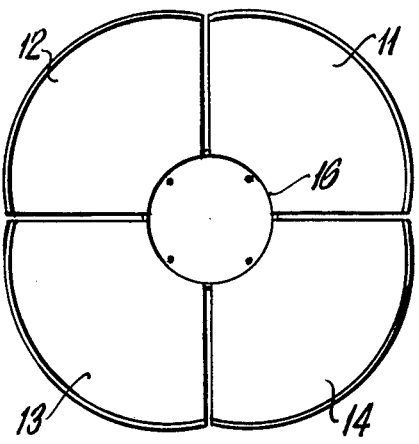
FIG. 10 is an enlarged cross-sectional view taken on a plane vertical to the axis in FIG. 3 and showing the distortion of the reflector sections in exaggerated form for purposes of illustration.

As illustrated in FIG. 10, the sectors are not clamped between their outer edges 41–44 and the neck 16. Consequently, the sectors which are relatively stiff will retain their original shape, that is, the shape they had as portions of the original deep-dish ellipse. FIG. 10 is a cross-sectional view taken at a plane vertical to axis 17 at a mid-point between the outer edges and the line 40. As shown in FIG. 10, in exaggerated form for purposes of illustration, each of the sectors 11–14 retains its original elliptical form. Alternatively a new set of ellipses is generated about the new set of axes A', where that new set of axes A' forms a right circular cone with the apex of that cone at the point where the axes A intersect axes A'.

Figure 7:
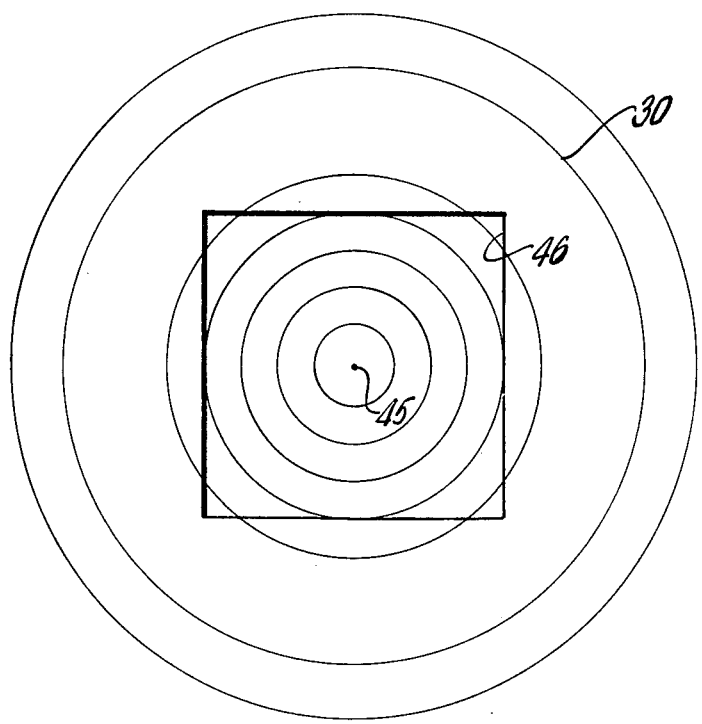
FIG. 7 is a front plan view of a film aperture receiving a beam of light from a prior art reflector.

In the light beam of the prior art the entire deep-dish ellipse focuses at a common central point 45 in the prior art aperture 46, see FIG. 7. Each of the four sectors 11–14, as each of the axes is shifted upwardly, will now focus toward a new point or area, respectively 47–50, within the aperture 51 of the projection system of the present invention, as shown in FIG. 8. These points 47–50, in effect, are the imaginary extensions of the new shifted axes of the sectors 11–14 as they intersect with an imaginary plane through the aperture 51.

Figure 9:
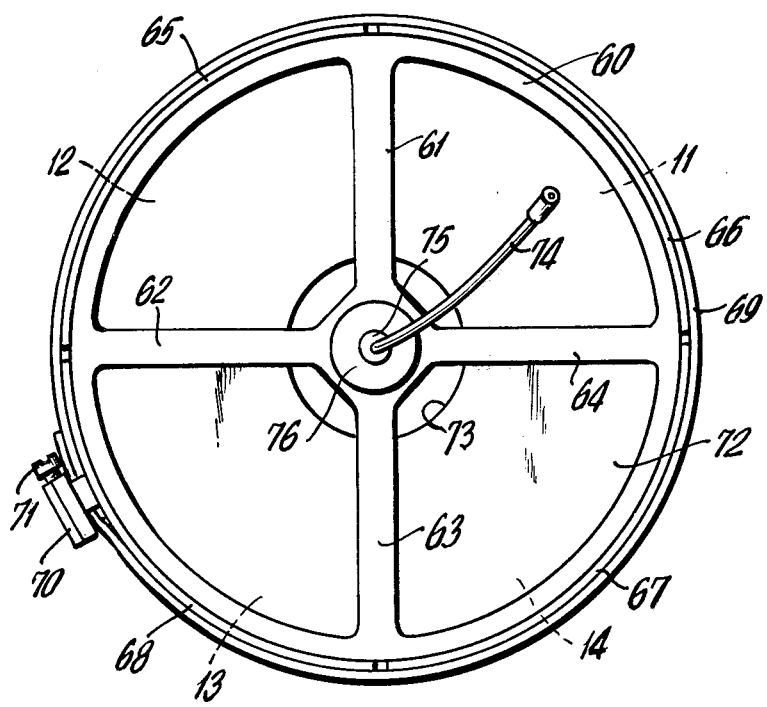
FIG. 9 is a front plan view of the assembled reflected arc light after deformation of the reflector sectors.

A preferred embodiment of the physical structure to mount the reflector of the present invention is illustrated in FIG. 9. As shown, the outer edges 41–44 of the reflector sectors 11–14 are held by means of a clamp ring 60, which is a ring of cast aluminum having inwardly directed spokes 61–64. Four shims 65–68 are between the outer edge of the ring 60 and the inner face of the edges 41-44. These shims 65-68 are metal members which are circular quarter sectors, as seen in FIG. 9, and are formed as flat ribbons having an accurate thickness. This permits adjustments for the size and shape of various apertures, such adjustments being made by using shims of different thicknesses. The thickness of the shims determines the outward deformation (outward translation) of the reflector sectors. That outward deformation has a preferred diameter of 0.060 inch for a reflector having a diameter of 6.250 inches prior to deformation and 6.310 after deformation. The range of deformation is expressed by the formula for the angle $\theta$ expressed above.

The inner faces of the edges 41-44 are positioned on the outer faces of the shims 65-68. The outer faces of the edges 41-44 are then encircled by a stainless steel hose clamp 69 having a hose clamp connection 70 and a turning screw 71. Rotation of the screw 71 will tighten the hose clamp 69 and firmly hold the outer edges 41-44 of the reflector sectors 11-14 between the hose clamp 69 and the shims 65-68. A disk 72 of transparent heat-resistant material (e.g., pyrex glass) having an internal circular aperture 73, is positioned beneath the spokes 61-64 of the ring 60 as a projector against xenon arc lamp explosion, which is a safety feature. An electric line 74 leads to the insulated center 75 of the mounting post 76. The line 74 leads to the blunt terminal of the xenon arc lamp (not shown). The pointed terminal of the xenon arc lamp is connected by a line through the neck 16 and that line protrudes through the rear of the neck 16.

Figure 6:
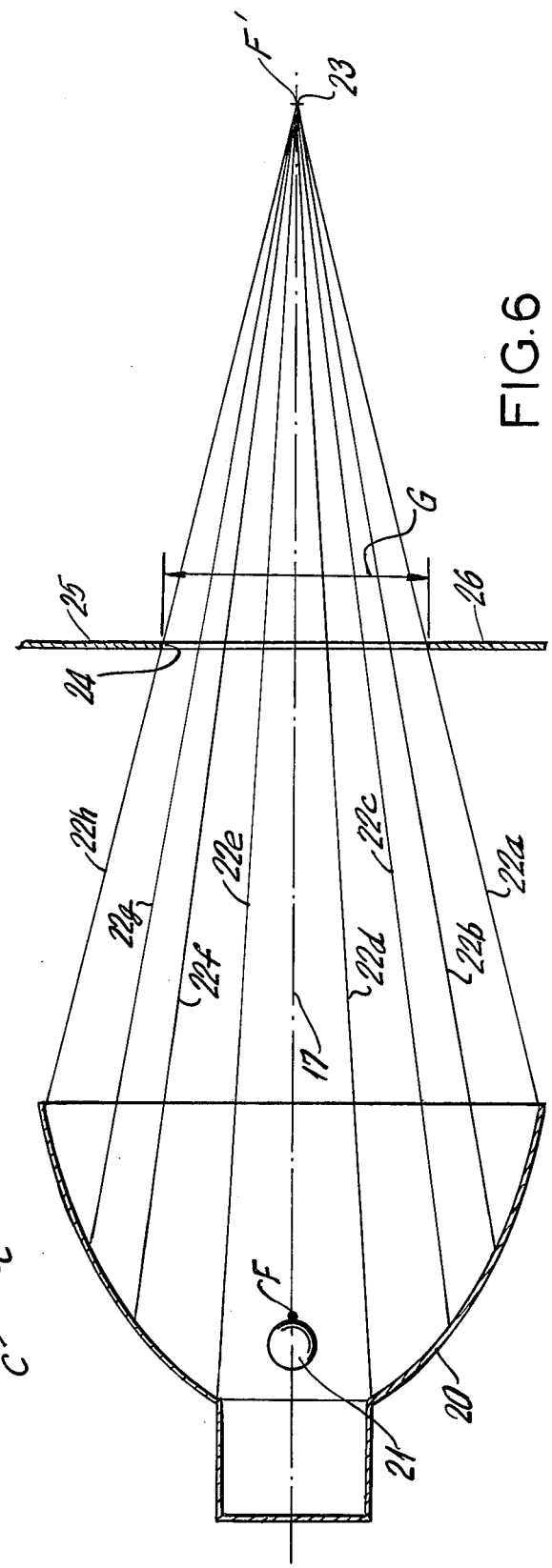
FIG. 6 is a cross-sectional view showing the positioning of a reflector in relationship to a film aperture and showing a bundle of rays from the reflector directed through the aperture.

A typical application of the quadruzonal reflector of the present invention is shown in FIG. 6. Reflector 20, produced according to FIGS. 1-5, has an arc lamp 21. The emission volume of the arc is near point F, the original focal point of the original elliptical reflector 20. The bundle of rays 22a-22h projected by the reflector 20 intersects at the image point 23 near the secondary focal point of the original ellipse. An aperture 24, which may be a film gate formed by walls 25, 26, is positioned near the point where the beam cross-section is approximately equal to the aperture crosssection.

The effect of the deformation of the present invention, as explained in connection with FIG. 4, can be seen in FIGS. 8 and 9. FIG. 7 represents the zone pattern projected on a screen using a projection lens in front of the aperture shown in FIG. 6 without using the reflector of the present invention. This zone pattern 30 is typical of elliptical, symmetric reflections using an arc lamp light source. The pattern is circular and is strongest at the center 45. For this reason, if one desired to cover the entire aperture with an even distribution, the pattern has to be spread out to between twice and three times the size of the aperture itself.

The zonal pattern from the deformed quadruzonal reflector of the present invention is shown in FIG. 8. The outward radial displacement of each quadrant at its outer edge displaces the zones at the aperture outwards, resulting in very little light spill-over. The circumferential deformation flattens out the zone pattern, making it quasi-rectangular in shape, to conform more effectively with the rectangular aperture. Upon outward displacement of each quadrant, that quadrant's focal point FD shifts slightly relative to the location of the emitting volume of the arc F, as shown in FIG. 5. That shift contributes to a desirable effect in helping attain an even distribution of light on the screen.

What is claimed is:

1. A projection system including a reflector, a light source positioned to illuminate the reflector, a film support having an aperture through which aperture light passes from the reflector, a projector lens and a screen, in which system the reflector comprises at least three reflector sectors;

each of said reflector sectors being a sector of a common deep-dish ellipse and having an original common axis, said sectors being radially outwardly translated relative to said common axis in the range of arc tan $$\frac{0.1L}{FF'} < \theta < \text{arc tan } \frac{0.8L}{FF'}$$

where L is the shortest length of the aperture, $\theta$ is the angle of translation taken relative to the original axis, F is the primary focal point of the original deep-dish ellipse and F' is the secondary focal point of the original deep-dish ellipse;

said sectors each forming in at least one imaginary vertical plane cross-sectional to said original axis a circular line for each sector, said circular lines for the different sectors having different centers and having imaginary crossings in said plane if said lines are extended.

2. A projection system as in claim 1 and having four reflector sectors.

3. A projection system as in claim 1 wherein said light source is an arc lamp having its arc at the primary focal point of the original ellipse.

4. A projection system including a reflector, a light source positioned to illuminate the reflector, a film support having an aperture through which aperture light passes from the reflector, a projector lens and a screen, in which system the reflector comprises at least three reflector sectors;

each of said reflector sectors being a sector of a common deep-dish ellipse and having an original common axis, said sectors being radially outwardly translated relative to said common axis in the range of arc tan $$\frac{0.1L}{FF'} < \theta < \text{arc tan } \frac{0.8L}{FF'}$$

where L is the shortest length of the aperture, $\theta$ is the angle of translation taken relative to the original axis, F is the primary focal point of the original deep-dish ellipse and F' is the secondary focal point of the original deep-dish ellipse; and the system including means to fasten the reflector sectors at their outer wider ends in a circle whose diameter is larger than the diameter of the outer end of the original ellipse.

5. A projection system as in claim 4 and having four reflector sectors.

6. A projection system as in claim 4 and further including means to fasten the inner narrower ends of the reflector sectors in a circle perpendicular to said original axis.

7. A projection system as in claim 4 wherein said light source is an arc lamp having its arc at the primary focal point of the original ellipse.

8. The method of forming a reflector for use in a projector system, said method comprising the following steps:

a. forming a bendable metal reflector material into the shape of a deep-dish ellipse having a primary focal point and an axis;
b. slitting said ellipse reflector into at least three reflector sectors, said slits starting at the outer edge and terminating at predetermined points at equal distances from the apex of said ellipse;
c. transposing the outer edges of each of the reflector sectors radially outward a distance in the range of arc tan $$\text{arc tan} \frac{0.1L}{FF'} < \theta < \text{arc tan} \frac{0.8L}{FF'}$$

where L is the shortest length of the aperture, $\theta$ is the angle of translation taken relative to the original axis, F is the primary focal point of the original deep-dish ellipse and F' is the secondary focal point of the original deep-dish ellipse; and
d. clamping the outer edges of the reflector in their transposed position.

9. The method of claim 8 wherein said outer edges are clamped by positioning the edges between shims and a hose clamp, the shims resting on a ring, and then tightening the hose clamp.

10. The method of claim 8 and including the further step of forming a tubular neck portion which terminates at its inner end at a connection line with said reflector sectors.

11. The method of claim 10 wherein said connection line is in a plane perpendicular to the optical axis and through the said primary focal point.

12. The method of claim 8 and including the further step of outwardly moving at least one reflector sector further than at least one other reflector sector.

13. The method of claim 12 wherein there are four reflector sectors and wherein each opposite sector is moved outwardly the same amount but the outward movement of adjacent reflector sectors is different in extent.

14. The method of claim 8 and including the step of positioning an arc lamp within said reflector with its arc at the original primary focal point.

15. The method of claim 8 and including the further step of illuminating the aperture of a film positioning means with a light beam from said reflector with the cross-section of said beam being slightly larger than the cross-section of said aperture.

* * * * *